United States Patent [19]

Abreu

[11] 4,026,387

[45] May 31, 1977

[54] WHEELCHAIR LIFT

[76] Inventor: Vasco O. Abreu, 315 Gardner St., New Bedford, Mass. 02740

[22] Filed: Jan. 12, 1976

[21] Appl. No.: 648,467

[52] U.S. Cl. .................................. 187/9 R; 187/24; 214/75 R; 214/75 T

[51] Int. Cl.² .......................................... B60P 1/44

[58] Field of Search ............... 187/9 R, 1 R, 24, 25; 214/75 R, 75 T

[56] References Cited

UNITED STATES PATENTS

| | | | |
|---|---|---|---|
| 758,493 | 4/1904 | Abbey | 214/75 R |
| 1,457,639 | 6/1923 | Straight | 187/9 R |
| 3,291,261 | 12/1966 | Robb | 214/75 R |
| 3,515,294 | 6/1970 | Southward et al. | 214/75 R |
| 3,516,559 | 6/1970 | Walter | 214/75 R |
| 3,651,965 | 3/1972 | Simonelli et al. | 214/75 R |
| 3,661,228 | 5/1972 | Glasser | 187/1 R |
| 3,710,962 | 1/1973 | Fowler | 214/75 R |
| 3,737,009 | 6/1973 | Stoddard | 187/1 R |
| 3,893,576 | 7/1975 | Casady | 214/75 R |
| 3,912,048 | 10/1975 | Manning | 214/75 R |

*Primary Examiner*—John J. Love
*Assistant Examiner*—Jeffrey V. Nase
*Attorney, Agent, or Firm*—Barlow & Barlow

[57] ABSTRACT

A lift for raising or lowering a wheelchair into or from a vehicle, such as a trailer or bus, which comprises a platform pivoted at a single point or location for swinging through about 90° from beneath the trailer to a position at right angles thereto. The pivot is on the end of a shaft which may be raised and lowered so that the lift may be on the ground to receive a wheelchair and then lifted to a height of the level of the doorsill of the trailer for the wheelchair to be wheeled into the vehicle. The vehicle need be changed in no way, but the lift will be just added thereto.

5 Claims, 8 Drawing Figures

WHEELCHAIR LIFT

BACKGROUND OF THE INVENTION

Usually wheelchair lifts for vehicles have been arranged so that the lift houses within the vehicle and takes up space. The lift is usually supported at two locations for swinging upwardly into the vehicle. Often the vehicle upon which it is mounted has to be altered in some way in order to receive the lift.

SUMMARY OF THE INVENTION

A platform which is raised and lowered is mounted adjacent the side opening in the vehicle, which opening is usually closed by a door. This platform is on the outside of the vehicle on a single pivot at the end of a vetical shaft which may be raised and lowered by a screw operated electric jack. When in partly lowered position, the platform may be swung beneath the vehicle and stored out of the way while when it is to be used the platform is swung at generally right angles to the vehicle in front of the door opening into the vehicle andraised to the height of the doorsill of the trailer so that a wheelchair may be rolled off the platform into the trailer. A ramp may be provided from the platform to the ground which ramp is folded over the platform when not needed for use. When the platform is stored beneath the vehicle the jack may raise the platform in this stored position against the bottom of the vehicle to provide sufficient friction so that the platform will remain in stored position. When swung to its operating position, there is a bracket which will engage some part attached to the bottom of the vehicle so that the platform will not swing beyond a position at right angles to the vehicle when the wheelchair is rolled thereon.

DESCRIPTION OF THE PREFERRED EMBODIMENT

Figure 1:
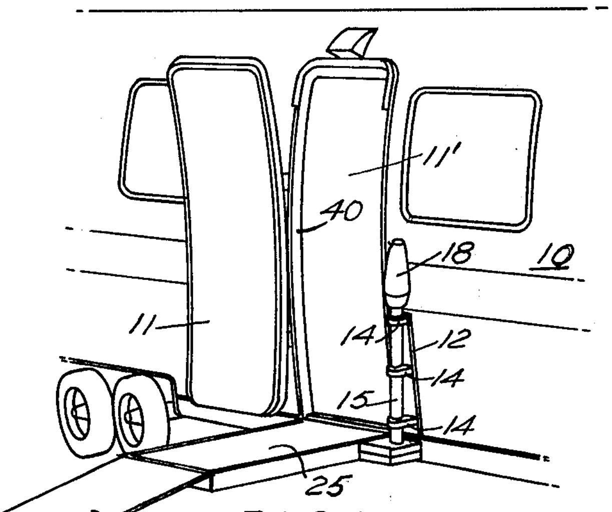
FIG. 1 is a perspective view showing the platform mounted adjacent the door of a trailer vehicle fragmentally shown.

With reference to the drawings 10 designates the side wall of the trailer or vehicle with which this platform is to be assembled while 11 designates the door for the opening 11' in the side of the trailer which door is shown in open position for the use of the platform to be here described. The door frame is designated 40. The mounting for the platform comprises a plate 12 which is bolted along the side of the door opening and upon this plate there are hanger brackets 14 which mount a cylindrical housing 15 which contains a threaded shaft 16 which may be rotated to raise and lower an internally threaded shaft 17 by rotation of a two-way electric motor 18 having a rocker switch 19 for control. The motor is of a reversible type so that when the switch is thrown in one position the screw mechanism is so rotaed as to raise the shaft 17 within the cylinder 15 and when rocked in the other direction it will lower the shaft 17 within the cylinder 15. The lower end of the shaft 17 is reduced as at 21.

Figure 2:
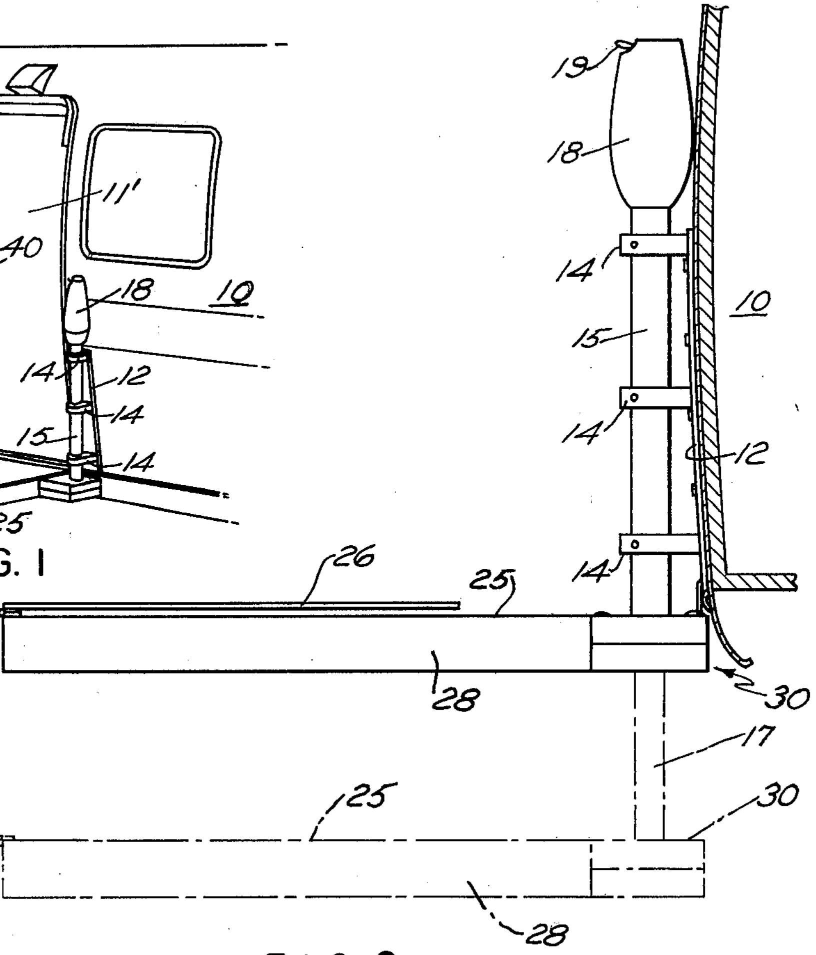
FIG. 2 is an elevation on a larger scale of the platform showing it in full lines in raised position and in dotted lines in lowered position.
Figure 3:
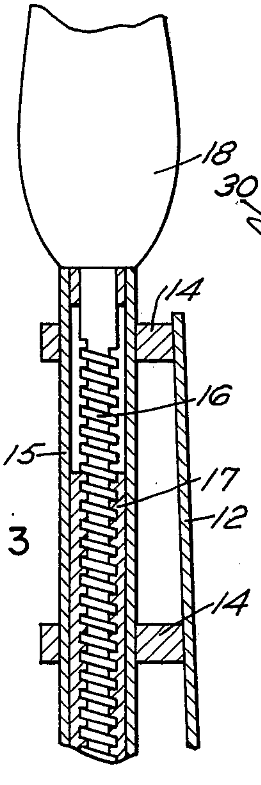
FIG. 3 is a fragmental sectional view of the upper part of the lifting and lowering jack.
Figure 5:
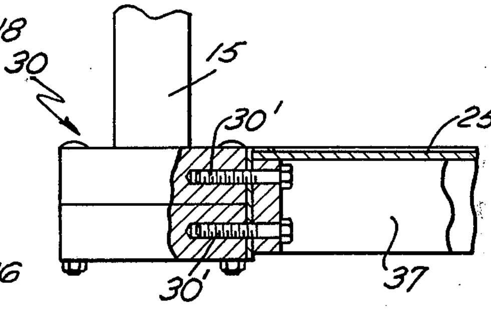
FIG. 5 is a fragmental view of the jack mounting bracket.
Figure 4:
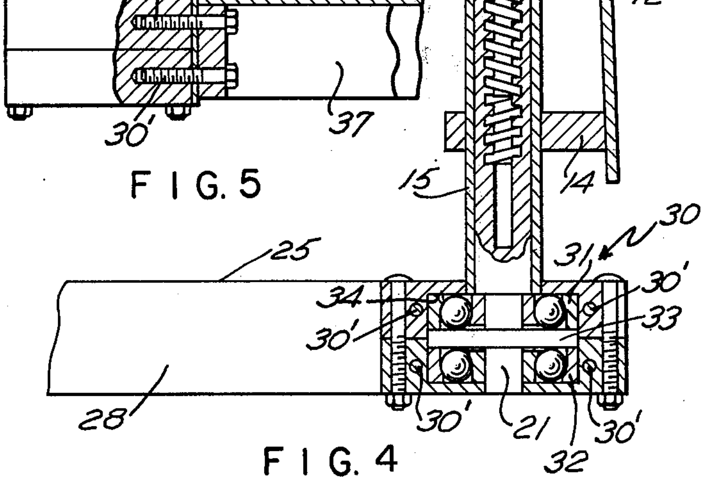
FIG. 4 is a fragmental sectional view of the lower part of the jack and its attachment to the platform.
Figure 7:
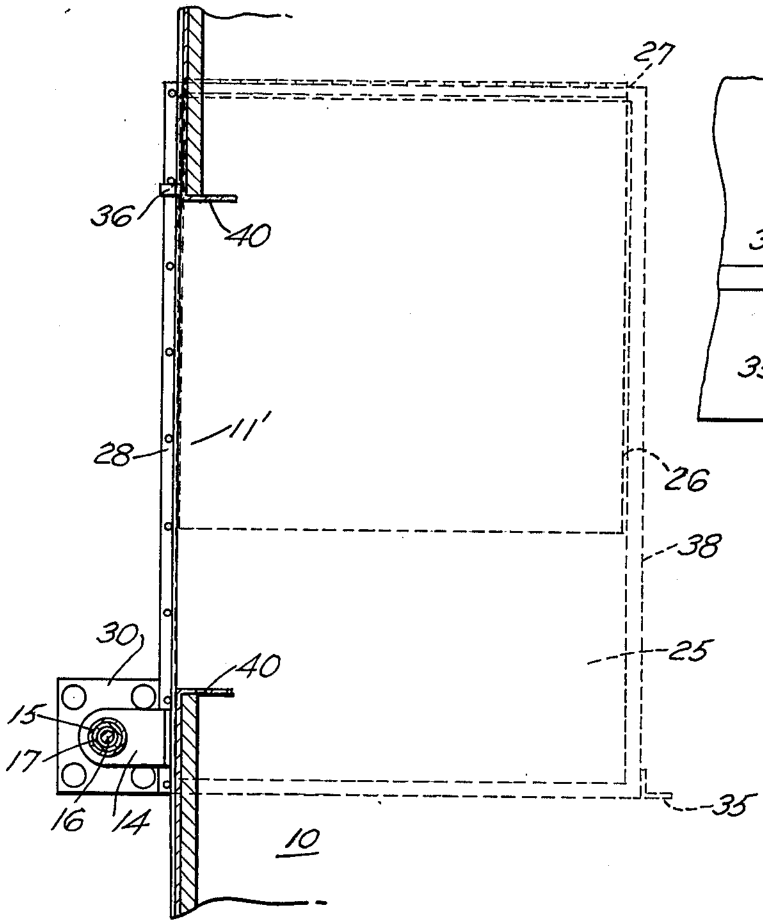
FIG. 7 is a plan view of the platform in stored position beneath the trailer.
Figure 8:
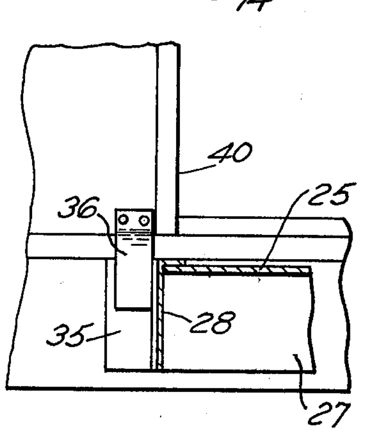
FIG. 8 is a fragmental elevational view of the locking of the platform in working position.

A platfrom 25 is of generally rectangular shape having a ramp 26 hinged as at 27 along a front edge thereof which ramp may be folded into overlapping position on the platform as shown in FIG. 2. This platform has a side edge 28 and upon this side edge near the back edge 29 there is secured by bolts 30' a bracket 30. This bracket mounts a pair of ball bearings 31 and 32. A spacer ring 33 between these bearings receives the lower reduced portion 21 of the shaft 17 and is fixed thereto and is located between the two ball bearings which are fixed in the bracket 30 by shoulders 34 so as to hang the platform on this end of the shaft for swingably mounting the platform so that it may pivot at least 90° about the axis of shaft 16 as 17. When this platform is in intermediate position from raised to lowered, it may be swung about this pivotal mounting to a location beneath the vehicle as shown in FIG. 7 and then raised to be in frictional contact with the bottom of the vehicle so that it will be held there by this frictional contact and will not swing out. However, by lowering the platform slightly from this frictional engagement, the platform may be swung outwardly to be about at right angles to the vehicle as in FIG. 1, 2, 6 and then raised so that the near edge 29 will be at substantially the level of the lower edge of the threshhold of the door opening 11'. At the time that the platform is raised into this operating position there is an angle iron 35 mounted on the edge of the platform which receives a dog 36 extending downwardly from the body of the trailer to lock the platform in the outwardly projecting or operating position so that when a wheelchair is rolled out of the door opening 11' of the trailer onto the platform, the platform will not pivot around the shaft on which it is mounted. The wheelchair may be operated through means of the ramp 26 with the platform in either full lowered position or in raised position. The vertical position of the platform is under control of the occupant of the wheelchair when on the platform 25 who will then be adjacent switch 19.

Figure 6:
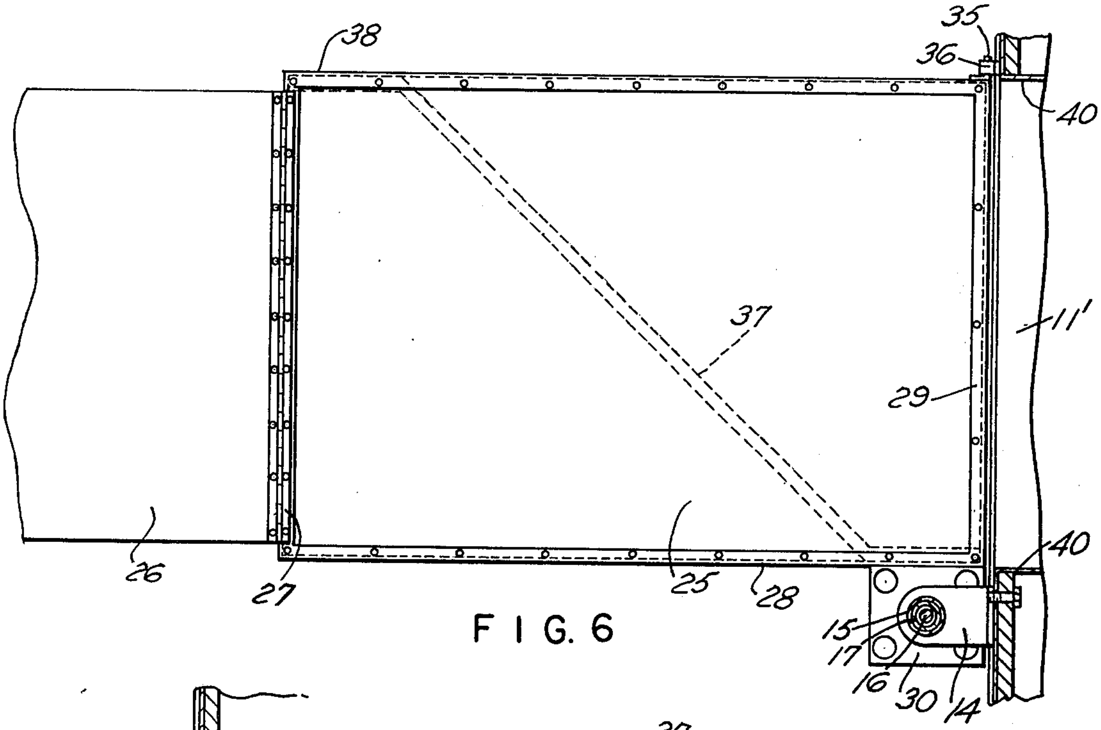
FIG. 6 is a plan view of the platform in operating position.

A torsion bar 37 (FIG. 6) extends from a location adjacent the bracket 30 diagonally across the platform to a point adjacent the corner 38 so as to provide additional support for the platform when weight is placed upon it.

From the above it will be apparent that I have made no changes in the trailer for the mounting of the wheelchair lift but have merely attached the parts of the wheelchair lift to the trailer on the outer surface thereof. By this arrangement the housing of the platform and its associated parts do not enter the trailer to take up any room but store conveniently in secure position beneath the trailer. All raising and lowering of the platform is by an electric jack at a convenient location by the wheelchair occupant when located on platform 25.

I claim

1. A lift device attached to a vehicle having an access opening comprising a jack having a shaft reciprocably movable in generally an axial direction, means mounting said jack on the outside of the vehicle adjacent said opening with the axis of said shaft generally vertical and outside of the vehicle, means to move said shaft in either upward or downward axial direction, a platform of a size to receive a wheelchair pivotally mounted solely at the end portion of said shaft for swinging about the axis of said shaft through at least 90° from a stored position beneath said vehicle to an operating position at generally right angles to and outside the vehicle.

2. A lift as in claim 1 wherein a ramp is hinged to the edge of said platform distant from said pivotal mounting to fold over said platform.

3. A lift as in claim 1 wherein a locking means comprising a member on said platform and a member mounted on the vehicle are positioned to engage to hold the platform against swinging beyond an operating position.

4. A lift as in claim 1 wherein the platform when in stored position may be raised to engage the underside of the vehicle with sufficient friction to hold the platform in stored position.

5. A lift as in claim 1 wherein a torsion bar extends beneath the platform from a location adjacent its pivot diagonally to its far edge.

* * * * *